United States Patent [19]

Mitra et al.

[11] Patent Number: 5,426,673
[45] Date of Patent: Jun. 20, 1995

[54] DISCRETE COSINE TRANSFORM-BASED IMAGE CODING AND DECODING METHOD

[75] Inventors: Sanjit K. Mitra, Santa Barbara; Sung-Hwan Jung, Goleta, both of Calif.

[73] Assignee: The Regents of the University of California, Oakland, Calif.

[21] Appl. No.: 194,201

[22] Filed: Feb. 9, 1994

[51] Int. Cl.⁶ .............................. H04B 1/66
[52] U.S. Cl. ........................ 375/241; 348/398
[58] Field of Search ............ 375/25, 22, 122; 348/390, 398, 384, 405, 400; 382/43; 381/29, 30, 34, 35; 395/2.12; 358/432, 433, 426, 261.3

[56] References Cited

U.S. PATENT DOCUMENTS

| | | | |
|---|---|---|---|
| 4,943,855 | 7/1990 | Bheda et al. | 348/398 |
| 4,974,078 | 11/1990 | Tsai | 348/408 |
| 5,006,929 | 4/1991 | Barbero et al. | 348/420 |
| 5,068,744 | 11/1991 | Ito | 358/310 |
| 5,107,348 | 4/1992 | Citta et al. | 348/412 |
| 5,168,375 | 12/1992 | Reisch et al. | 358/432 |
| 5,216,518 | 6/1993 | Yamagami | 358/426 |
| 5,231,485 | 7/1993 | Israelsen et al. | 348/405 |
| 5,235,434 | 8/1993 | Waber | 358/448 |
| 5,247,357 | 9/1993 | Israelsen | 348/418 |
| 5,297,236 | 3/1994 | Antill et al. | 395/2.12 |
| 5,305,115 | 4/1994 | Takahashi et al. | 348/390 |
| 5,309,232 | 5/1994 | Hartung et al. | 348/384 |

OTHER PUBLICATIONS

"Efficient Frequency Sampling Design of-One and Two Dimensional FIR Fitters Using Structural Subbaud Decomposition", IEEE Trans. on Circuit of Systems, Mitra et al. pp. 189-201, 1994.

Mitra et al. (1990) Sig. Proc. V: Theor. Appl. Lagunas (eds.) Elsevier Science Publ. pp. 501-504.

Mitra et al. (1990) IEEE M5.10 "A Meth. for Fast . . ." 2025-2028.

Leonard (Mar. 1993) Electronic Design pp. 109, 112, and 113.

*Primary Examiner*—Stephen Chin
*Assistant Examiner*—Tesfaldet Bocure
*Attorney, Agent, or Firm*—John P. O'Banion

[57] ABSTRACT

A fast discrete cosine transform (DCT) based method of encoding and decoding signals is disclosed. A signal of finite length is decomposed into subsignals of shorter length and an approximate DCT (A-DCT) is computed by keeping only selected subsignals. Computation time decreases relative to the number of subsignals being used to compute the A-DCT, fewer subsignals resulting in a faster computation. For signal compression applications, the computed A-DCT coefficients are quantized and coded. For signal recovery, the encoded A-DCT coefficients are processed through a decoder and the decoded signal is recovered using a direct inverse DCT (I-DCT). In some applications, an approximate inverse DCT (AI-DCT) based on similar decomposition can be used to recover the signal from the encoded data. In image coding applications, the image recovered from the decoded signal exhibits negligible block artifacts compared to conventional JPEG, particularly for low bit rate compression.

20 Claims, 1 Drawing Sheet

DISCRETE COSINE TRANSFORM-BASED IMAGE CODING AND DECODING METHOD

BACKGROUND OF THE INVENTION

1. Field of the Invention

This invention pertains generally to discrete cosine transform encoding and decoding of two dimensional images, and more particularly to a discrete cosine transform based method of removing block artifacts in the recovered image and increasing processing speed.

2. Description of the Background Art

Image processing plays an important role in applications such as electronic processing of photographic images, transmission of video images in communications systems, and in the storage, recovery and transmission of image data in general. In particular, discrete transform of finite-length data sequences plays an important role in the foregoing, as well as other, signal processing applications. As a result, various discrete transform methods have been developed. Of particular interest is the discrete cosine transform (DCT) which is generally recognized as the best and effective way to encode image information. For compression of a highly correlated image, DCT encoding approaches the optimum performance of the Karhunen Loeve Transform (KLT). Therefore, DCT has been adopted for use in the JPEG (Joint Photographic Expert Group) and MPEG (Motion Picture Expert Group) international data compression standards for still images and video images, respectively.

Although DCT is a highly effective method of encoding, in very low bit rate coding the DCT exhibits severe block artifacts which can affect resolution and, therefore, are often undesirable. Further, the amount of time required for the DCT computation can be excessive. For example, MPEG compression is an asymmetrical process, and takes considerably more time to compress an image than it does to decompress an image. An MPEG data stream contains two layers; a system layer that contains timing, video and audio synchronization and other demultiplexing information, and a compression layer that includes the actual audio and image streams.

Prior to encoding, if the incoming video source is an analog signal, it is sampled and converted to a digital data stream. Each frame of the image is pre-filtered, scaled to size, and edge-smoothed. In the encoding process, both interframe encoding (which compares adjacent frames) and intraframe encoding (which looks within a signle frame) schemes are used. For motion detection, MPEG uses the first frame as a reference frame, divides the visual array of the reference frame into macroblocks of 16×16 pixels, and compares the information in the macroblocks with subsequent frames. Each macroblock is compared with the surrounding 128×96 pixel area to eliminate temporal redundancies. This sets up the motion prediction of the images and reduces the data size of subsequent frames. After motion prediction, MPEG divides the macroblocks into four subblocks of 8×8 pixels for spatial compression within individual frames. The 8×8 block is transformed to frequency coefficients using the same DCT encoding used in the JPEG method, and the coefficients are quantized to remove unnecessary information. In this so-called "lossy" compression, most of the decimation takes place in the higher frequencies which are less perceptible to human eyes. Following DCT and quantization, the block is mapped to a one dimensional sequence using a zig-zag scan. Run-length encoding reduces redundant information by flagging long sequences of identical pixels. Still, however, the coding is a slow process due to the number of transform coefficients involved. Further, when the encoded information is subsequently decoded, since the DCT operated on 8×8 pixel subblocks of the image the recovered image can exhibit block artifacts where the block boundaries of the encoded image are visible.

While various methods have been developed for faster DCT computations, as well as for reducing block artifacts, there is no known method for both removing block artifacts and increasing the speed of the DCT computation, particularly with regard to low bit rate encoding. The present invention satisfies that need, as well as others, and overcomes deficiencies in encoding and decoding methods heretofore developed.

SUMMARY OF THE INVENTION

The present invention pertains generally to a DCT-based method of encoding and decoding images which removes block artifacts found in conventional DCT encoded images and which reduces the time required for compression and decompression of the images. By way of example, and not of limitation, a visual image of size N×N which has been electronically scanned, photographed, or the like, is decomposed into subimages using a filter bank and the sub-image corresponding to the low-low frequency components is kept. Next, an approximate DCT (A-DCT) is computed from o the (N/2)×(N/2) low-low sub-image. Then, the A-DCT coefficients saved are quantized and Huffman coded based on the JPEG method. The encoded image data can then be transmitted or stored for subsequent decoding. In the decoder, the encoded A-DCT coefficients are first processed through a run length and Huffman decoding procedure. Finally, the decoded image is recovered using a direct (N×N)-point inverse DCT (I-DCT). The method can also be applied to one dimensional signals of finite length.

An object of the invention is to remove block artifacts from DCT encoded images.

Another object of the invention is to reduce the amount of time required to encode images.

Another object of the invention is to remove block artifacts from low-bit rate coded images.

Further objects and advantages of the invention will be brought out in the following portions of the specification, wherein the detailed description is for the purpose of fully disclosing preferred embodiments of the invention without placing limitations thereon.

BRIEF DESCRIPTION OF THE DRAWINGS

The invention will be more fully understood by reference to the following drawings which are for illustrative purposes only.

DESCRIPTION OF THE PREFERRED EMBODIMENTS

Referring more specifically to the drawings, for illustrative purposes the present invention is described with reference to FIG. 1 through FIG. 3. It will be appreciated that the apparatus may vary as to configuration and as to details of the parts, and the method may vary as to steps and their sequence, without departing from the basic concepts as disclosed herein.

Figure 1:
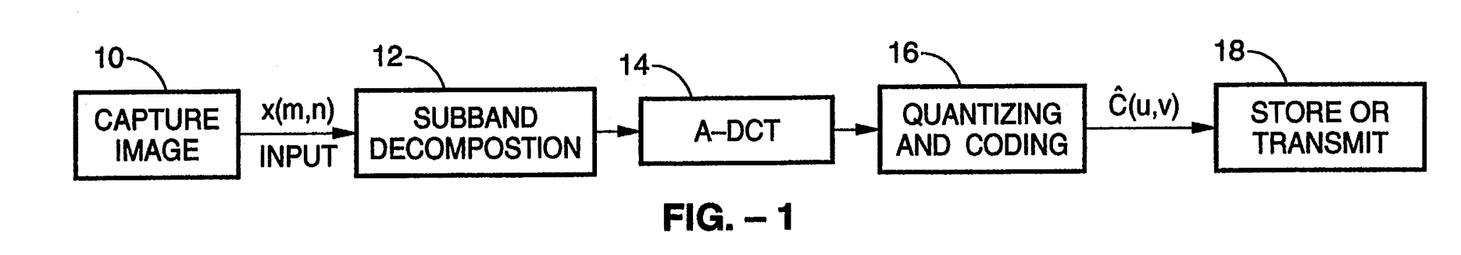
FIG. 1 is a functional block diagram showing image encoding in accordance with the method of the present invention.

Referring to FIG. 1, a functional block diagram showing a typical sequence of steps for image encoding in accordance with the present invention can be seen. At step 10, a still frame or moving visual image is captured and digitized using conventional imaging equipment such as a camera, frame grabber board, and related equipment, or the like. If a moving image is captured, it is encoded frame by frame. At step 12, each frame of the resulting image signal x(m,n) of size N×N is decomposed into four blocks or subbands using a Hadamard filter bank or the like, and the sub-image corresponding to the low-low frequency components is kept. Next, at step 14, an (N/2)×(N/2)-point subband DCT (SB-DCT) is developed from the low-low sub-image, thus computing approximately only the ¼ of the transform coefficients corresponding to the low-low frequencies. In this step, an approximate DCT (A-DCT) is computed for the complete image signal.

In order to fully understand the nature of the A-DCT, a review of the nature of the DCT is useful. The DCT of an N-point data sequence x(n), n=0, 1, ..., N−1 is defined as $$C(k) = \sum_{n=0}^{N-1} 2x(n)\cos\left(\frac{(2n+1)\pi k}{2N}\right), 0 \leq k \leq N-1 \quad (1)$$

The length-N input sequence x(n) can be decomposed into two subsequences g(n) and h(n) of length N/2 each:

$$g(n) = \tfrac{1}{2}\{x(2n)+x(2n+1)\},$$
$$h(n) = \tfrac{1}{2}\{x(2n)-x(2n+1)\}, n=0, 1, \ldots, N/2-1 \quad (2)$$

The original sequence x(n) can then be reconstructed from the subsequences g(n) and h(n) by means of the inverse relationship $$x(2n) = g(n)+h(n),\ x(2n+1) = g(n)-h(n), \quad (3)$$

for $$n=0, 1, \ldots, N/2-1$$

Figure 2:
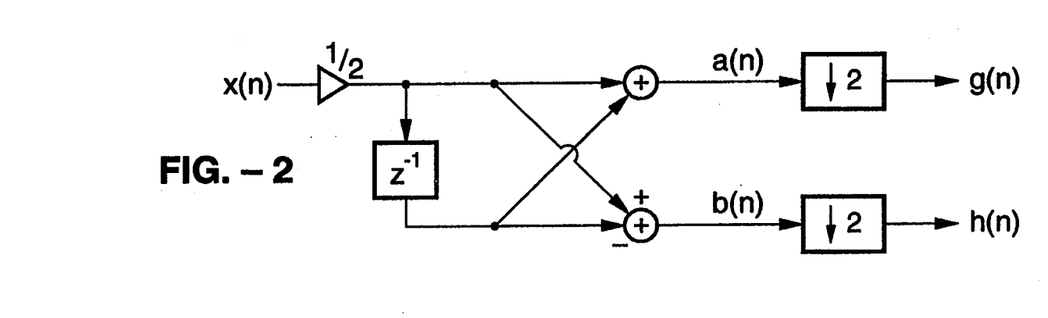
FIG. 2 is a functional block diagram showing subsequence generation by a two-band subband decomposition.

A functional model of the generation of the subsequences g(n) and h(n) is shown in FIG. 2, from which it can be seen that the subsequence g(n) is the down-sampled version of the lowpass filtered sequence a(n), and the subsequence h(n) is the down-sampled version of the highpass filtered sequence b(n).

Substituting Equation (3) into Equation (1), Equation (1) can be rewritten as:

$$C(k) = \sum_{n=0}^{\frac{N}{2}-1} 2x(2n)\cos\left(\frac{(4n+1)\pi k}{2N}\right) + \sum_{n=0}^{\frac{N}{2}-1} 2x(2n+1)\cos\left(\frac{(4n+3)\pi k}{2N}\right) \quad (4)$$

-continued
$$= 2\cos\left(\frac{\pi k}{2N}\right)\sum_{n=0}^{\frac{N}{2}-1} 2g(n)\cos\left(\frac{(2n+1)\pi k}{N}\right) +$$
$$2\sin\left(\frac{\pi k}{2N}\right)\sum_{n=0}^{\frac{N}{2}-1} 2h(n)\sin\left(\frac{(2n+1)\pi k}{N}\right)$$

or equivalently as $$C(k) = 2\cos\left(\frac{\pi k}{2N}\right)C_g(<k>_{\frac{N}{2}}) + 2\sin\left(\frac{\pi k}{2N}\right)S_h(<k>_{\frac{N}{2}}), \quad (5)$$

for k=0, 1, ..., N−1, where $C_g(k)$ is the (N/2)-point DCT of g(n), $S_h(k)$ is the (N/2)-point discrete sine transform (DST) of h(n), and $<k>_M$ denotes k modulo M. This determination of the N-point DCT using Equation (5), requiring the computation of an (N/2)-point DCT and an (N/2)-point DST, is the SB-DCT referred to herein.

The SB-DCT of Equation (5) can be repeated by replacing the computation of the two (N/2)-point transforms, $C_g(k)$ and $S_h(k)$, with expressions involving (N/4)-point transforms as follows:

$C_g(k)$: (6a)

$$= 2\cos\left(\frac{\pi k}{2N}\right)\sum_{n=0}^{\frac{N}{4}-1} 2g_g(n)\cos\left(\frac{(2n+1)2\pi k}{N}\right) +$$
$$2\sin\left(\frac{\pi k}{2N}\right)\sum_{n=0}^{\frac{N}{4}-1} 2g_h(n)\sin\left(\frac{(2n+1)2\pi k}{N}\right)$$
$$= 2\cos\left(\frac{\pi k}{N}\right)C_{gg}(<k>_{\frac{N}{4}}) + 2\sin\left(\frac{\pi k}{N}\right)S_{gh}(<k>_{\frac{N}{4}}),$$
$$k = 0, 1, \ldots, \frac{N}{2} - 1$$

$S_h(k)$: (6b)

$$= 2\cos\left(\frac{\pi k}{2N}\right)\sum_{n=0}^{\frac{N}{4}-1} 2h_g(n)\sin\left(\frac{(2n+1)2\pi k}{N}\right) -$$
$$2\sin\left(\frac{\pi k}{2N}\right)\sum_{n=0}^{\frac{N}{4}-1} 2h_h(n)\cos\left(\frac{(2n+1)2\pi k}{N}\right)$$
$$= 2\cos\left(\frac{\pi k}{N}\right)S_{hg}(<k>_{\frac{N}{2}}) - 2\sin\left(\frac{\pi k}{N}\right)C_{hh}(<k>_{\frac{N}{4}}),$$
$$k = 0, 1, \ldots, \frac{N}{2} - 1$$

where $C_{gg}(k)$ and $C_{hh}(k)$ are the (N/4)-point DCTs of the subsequences $g_g(n)$ and $h_h(n)$ defined below:

$$g_g(n) = \tfrac{1}{2}\{g(2n)+g(2n+1)\}, \quad (7a)$$

$$h_h(n) = \tfrac{1}{2}\{h(2n)-h(2n+1)\}, n=0, 1, \ldots, N/4-1 \quad (7b)$$

and likewise, $S_{gh}(k)$ and $S_{hg}(k)$ are the (N/4)-point DCTs of the subsequences $g_h(n)$ and $h_g(n)$ defined below:

$$g_h(n) = \tfrac{1}{2}\{g(2n)-g(2n+1)\}, \quad (8a)$$

$$h_g(n) = \tfrac{1}{2}\{h(2n)+h(2n+1)\}, n=0, 1, \ldots, N/4-1 \quad (8b)$$

Assuming that certain frequency bands have negligible energy contribution, discarding of the calculations to the components in those bands reduces the complexity of the computation process. In many applications, most of the relevant information in images is in the low frequencies. Therefore, an approximation of the DCT coefficients can be obtained by neglecting h(n), the high frequency components of x(n). The approach is intuitively satisfactory, as in the primary band of interest, the inequalities $$\left|\cos\left(\frac{\pi k}{2N}\right)\right| > \left|\sin\left(\frac{\pi k}{2N}\right)\right|, \quad |C_g(k)| \gg |S_h(k)| \tag{9}$$

hold. Thus, a simple reasonable approximation of overall DCT can be obtained by discarding the second term in Equation (5), which is the contribution by the high frequency components, and retaining only the ½ of the coefficients corresponding to the low frequency components. Accordingly, the approximate DCT (A-DCT) for low frequencies is:

$$\hat{C}(k) \equiv 2\cos\left(\frac{\pi k}{2N}\right) C_g(<k>_{\frac{N}{2}}), \quad k = 0, 1, \ldots, \frac{N}{2} - 1 \tag{10a}$$

$$= 0, \quad k = \frac{N}{2} \ldots N - 1$$

As can been seen from equation 10b, the term $C_g(<k>_{N/2})$ is the exact DCT and the term $$2\cos\left(\frac{\pi k}{2N}\right)$$

is a weighting factor which makes the approximate DCT $\hat{C}(k)$ as close as possible to the exact DCT based on the low frequency subcomponents. For applications where the relevant information is dominant in the high frequencies, an approximation of the DCT coefficients can be obtained by neglecting g(n), the low frequency components of x(n). Accordingly, the approximate DCT (A-DCT) for high frequencies is:

$$\hat{C}(k) \equiv 2\sin\left(\frac{\pi k}{2N}\right) S_h(<k>_{\frac{N}{2}}), \quad k = \frac{N}{2} \ldots N - 1 \tag{10b}$$

$$= 0, \quad k = 0, 1, \ldots, \frac{N}{2} - 1$$

Similarly, the term $S_h(<k>_{N/2})$ is the exact DCT and the term $$2\sin\left(\frac{\pi k}{2N}\right)$$

is a weighting factor which makes the approximate DCT $\hat{C}(k)$ as close as possible to the exact DCT based on the high frequency subcomponents. At step 16, the A-DCT coefficients $\hat{C}(u, v)$ are then quantized and Huffman coded based on the JPEG method or the like. Finally, at step 18 the encoded image is stored in a conventional magnetic storage media or the like, or transmitted across a communications channel.

Figure 3:
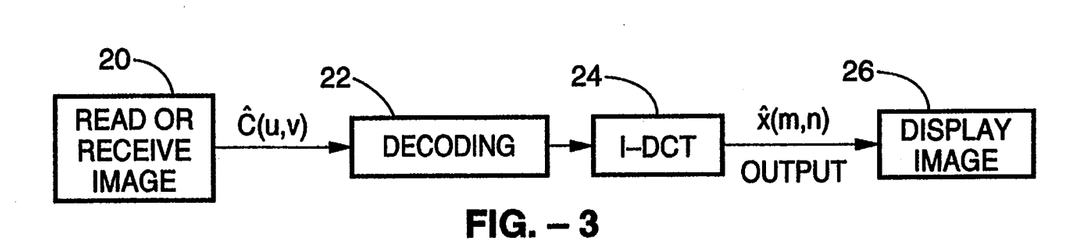
FIG. 3 is a functional block diagram showing image decoding in accordance with the method of the present invention.

Referring now to FIG. 3, a functional block diagram showing a typical sequence of steps for image decoding in accordance with the present invention can be seen. At step 20, the encoded image is read from the storage media or received over the communications channel. Then, at step 22, the encoded A-DCT coefficients are processed through a conventional JPEG like decoding procedure. Next, at step 24, the restored image $\hat{x}(m, n)$ is recovered through a direct (N×N)-point inverse DCT (I-DCT). In this regard, it can be noted that the inverse DCT (I-DCT) of N point data sequence x(n) is determined according to $$\hat{x}(n) = \frac{1}{N} \sum_{k=0}^{N-1} \zeta(k) C(k) \cos\left(\frac{(2n+1)\pi k}{N}\right), \quad 0 \leq n \leq N - 1 \tag{11}$$

where
$$\zeta(0) = \tfrac{1}{2}, \; \zeta(k) = 1 \text{ for } 1 \leq k \leq N - 1 \tag{12}$$

Also, note that if the dominant samples of the DCT are in the range of $0 < k < (N/2) - 1$, it can be assumed that $C(k) = 0$ for $k > (N/2) - 1$. Therefore, Equation (11) can be replaced with $$\hat{x}(n) = \frac{1}{N} \sum_{k=0}^{\frac{N}{2}-1} \zeta(k) \hat{C}(k) \cos\left(\frac{(2n+1)\pi k}{N}\right), \quad 0 \leq n \leq N - 1 \tag{13}$$

to obtain an approximate inverse DCT (AI-DCT). This approximation reduces the I-DCT computational complexity to about half of that needed in the original one according to Equation (11), and can be used for decoding images where satisfactory resolution is obtained. Otherwise, the direct I-DCT is used. Further simplifications can be carried out if the dominant DCT samples are restricted to still smaller ranges. As with encoding of the image, the I-DCT and AI-DCT are performed using a conventional programmed data processor. Finally, at step 26 the recovered image is displayed or printed using conventional devices.

Example 1

To verify the effectiveness of the use of A-DCT in image coding, a part of the standard LENA image of size 256×256 were used as test images. The method of the present invention was compared with conventional DCT based JPEG coding for low bit rate per pixel (bpp) applications. Simulation results of LENA in Table 1 show that the A-DCT and DCT based coding methods exhibit similar performances with respect to the peak signal to noise ratio (PSNR), but the A-DCT based approach is over two times faster than the conventional DCT based method.

Accordingly, it will be seen that this invention provides a fast and effective method of encoding and decoding images, particularly at low-bit rate encoding, while providing for removal of block artifacts. It can also be noted that the A-DCT method of encoding in accordance with the present invention performs a forward transform on the dominant subbands of the decomposed image signal. For most images, the dominant subband is the low-low frequency subband. However, the method could be applied equally to any other subband which is dominant. Also, the subband decomposition is not limited to four subbands, although four subbands is the minimum decomposition used. The method can also be applied to M×M subband decomposition, where $M = 2^L$ and L = an integer, for any image of size N×N. Furthermore, the method of the present invention can be applied to processing one dimensional audio signals where DCT processing is also used. Although the description above contains many specificities, these should not be construed as limiting the scope of the invention but as merely providing illustrations of some of the presently preferred embodiments of this invention. Thus the scope of this invention should be determined by the appended claims and their legal equivalents.

TABLE 1

| | METHOD | | | |
|---|---|---|---|---|
| | PSNR(dB) | | TIME(sec) | |
| bpp | A-DCT | STANDARD DCT | A-DCT | STANDARD DCT |
| 0.40 | 36.81 | 37.83 | 9.4 | 21.1 |
| 0.33 | 36.37 | 36.82 | 9.2 | 21.1 |
| 0.27 | 35.97 | 35.59 | 9.0 | 21.0 |
| 0.22 | 35.42 | 34.31 | 9.0 | 21.0 |
| 0.19 | 34.95 | 33.42 | 8.9 | 20.7 |

We claim:

1. A method for processing digital signals, comprising the steps of:
   (a) providing a digital signal;
   (b) decomposing said digital signal into a plurality of subbands, said subbands including one or more dominant frequency subbands;
   (c) discarding subbands other than said dominant frequency subbands and performing a discrete cosine transform on said dominant frequency subbands;
   (d) weighting the coefficients from said discrete cosine transform to make them as close as possible to coefficients for an exact discrete cosine transform of said digital signal to produce an approximate discrete cosine transform of said digital signal; and encoding said digital signal using coefficients from said approximate discrete cosine transform.

2. A method as recited in claim 1, wherein said digital signal has a size of N data points and said digital signal is decomposed into M subbands, where N is an integer, M is an integer, $M=2^L$ and $L=$an integer.

3. A method as recited in claim 1, further comprising the steps of performing an inverse discrete cosine transform on said encoded digital signal using said coefficients and decoding said encoded digital signal.

4. A method as recited in claim 1, wherein said step of discarding subbands other than said dominant subbands and performing a discrete cosine transform on said dominant frequency subbands comprises the step of performing an approximate discrete cosine transform of said digital signal according to $$\hat{C}(k) = 2\cos\left(\frac{\pi k}{2N}\right)C_g(<k>_{\frac{N}{2}}), \quad k=0, 1, \ldots, \frac{N}{2}-1$$
$$= 0, \quad k=\frac{N}{2}\ldots N-1$$

where said digital signal has a size of N data points, N is an integer, $\hat{C}$ is the approximate discrete cosine transform of said digital signal, $C_g$ is the (N/2)-point discrete cosine transform of subsequence g(n), $g(n)=\frac{1}{2}\{x(2n)+x(2n+1)\}$ for $n=0, 1, \ldots (N/2)-1$, x(n) is the N-point data sequence of said digital input signal, and said dominant frequency subband is a low frequency subband.

5. A method as recited in claim 1, wherein said step of discarding subbands other than said dominant frequency subbands and performing a discrete cosine transform on said dominant frequency subbands comprises the step of performing an approximate discrete cosine transform of said digital signal according to $$\hat{C}(k) = 2\sin\left(\frac{\pi k}{2N}\right)S_h(<k>_{\frac{N}{2}}), \quad k=\frac{N}{2}\ldots N-1$$
$$= 0, \quad k=0, 1, \ldots, \frac{N}{2}-1$$

where said digital signal has a size of N data points, N is an integer, $\hat{C}$ is the approximate discrete cosine transform of said digital signal, $S_h$ is the (N/2)-point discrete cosine transform of subsequence h(n), $h(n)=\frac{1}{2}\{x(2n)-x(2n+1)\}$ for $n=0, 1, \ldots (N/2)-1$, x(n) is the N-point data sequence of the digital signal, and said dominant frequency subband is a high frequency subband.

6. A method as recited in claim 3, wherein said inverse discrete cosine transform is performed on said encoded signal according to:

$$\hat{x}(n) = \frac{1}{N} \sum_{k=0}^{N-1} \zeta(k)\hat{C}(k)\cos\left(\frac{(2n+1)\pi k}{N}\right),$$
$$0 \leq n \leq N-1$$

where said digital signal has a size of N data points, N is an integer, $\hat{x}(n)$ is the N-point data sequence of said digital signal, $\hat{C}(k)$ is the discrete cosine transform of x(n), $\zeta(0)=\frac{1}{2}$ and $\zeta(k)=1$ for $1<k<N-1$.

7. A method as recited in claim 3, wherein said inverse discrete cosine transform is performed on said encoded signal according to:

$$\hat{x}(n) = \frac{1}{N} \sum_{k=0}^{\frac{N}{2}-1} \zeta(k)\hat{C}(k)\cos\left(\frac{(2n+1)\pi k}{N}\right),$$
$$0 \leq n \leq N-1$$

where said digital signal has a size of N data points, N is an integer, $\hat{x}(n)$ is the approximate N-point data sequence of said digital signal, $\hat{C}(k)$ is the approximate discrete cosine transform of the N-point data sequence x(n) of said digital input signal, $\zeta(0)=\frac{1}{2}$ and $\zeta(k)=1$ for $1<k<N-1$.

8. A method for processing a digital image signal, comprising the steps of:
   (a) extracting a plurality of subband blocks from said digital image signal, said subband blocks including a low-low frequency subband block;
   (b) discarding subband blocks other than said low-low frequency subband block, performing a discrete cosine transform on said low-low frequency subband block, and weighting the coefficients from said discrete cosine transform to make them as close as possible to coefficients for an exact discrete cosine transform of said digital signal to produce an approximate discrete cosine transform of said digital signal according to $$\hat{C}(k) = 2\cos\left(\frac{\pi k}{2N}\right)C_g(<k>_{\frac{N}{2}}), \quad k = 0, 1, \ldots, \frac{N}{2} - 1$$

$$= 0, \quad k = \frac{N}{2} \ldots N - 1$$

where said digital image signal has a size of N data points, N is an integer, $\hat{C}$ is the approximate discrete cosine transform of said digital image signal, $C_g$ is the (N/2)-point discrete cosine transform of subsequence g(n), $g(n) = \frac{1}{2}\{x(2n)+x(2n+1)\}$ for $n = 0, 1, \ldots (N/2)-1$, x(n) is the N-point data sequence of the digital image signal; and (c) encoding said digital image signal using discrete cosine transform coefficients corresponding to said low-low frequency subband block.

9. A method as recited in claim 8, wherein said digital image signal has a size of N×N data points where N is an integer and said digital image signal is decomposed into four subband blocks.

10. A method as recited in claim 9, wherein said step of performing an approximate discrete cosine transform on said digital image signal includes the step of performing an N/2×N/2-point discrete cosine transform on said N/2×N/2 low-low frequency subband block and weighting the coefficients from said discrete cosine transform to make them as close as possible to coefficients for an exact discrete cosine transform of said digital image signal to produce an approximate discrete cosine transform of said digital image signal.

11. A method as recited in claim 10, further comprising the steps of:
(a) decoding said encoded digital image signal; and
(b) performing an inverse discrete cosine transform on said decoded digital image signal according to $$\hat{x}(n) = \frac{1}{N}\sum_{k=0}^{N-1}\zeta(k)\hat{C}(k)\cos\left(\frac{(2n+1)\pi k}{N}\right),$$

$$0 \leq n \leq N - 1$$

where said digital image signal has a size of N data points, N is an integer, $\hat{x}(n)$ is the N-point data sequence of said digital image signal, $\hat{C}(k)$ is the discrete cosine transform of x(n), $\zeta(0) = \frac{1}{2}$ and $\zeta(k) = 1$ for $1 \leq k \leq N-1$.

12. A method as recited in claim 10, further comprising the steps of:
(a) decoding said encoded digital image signal; and
(b) performing an inverse discrete cosine transform on said decoded signal according to $$\hat{x}(n) = \frac{1}{N}\sum_{k=0}^{\frac{N}{2}-1}\zeta(k)\hat{C}(k)\cos\left(\frac{(2n+1)\pi k}{N}\right),$$

$$0 \leq n \leq N - 1$$

where said digital image signal has a size of N data points, N is an integer, $\hat{x}(n)$ is the approximate N-point data sequence of said digital image signal, $\hat{C}(k)$ is the approximate discrete cosine transform of the N-point data sequence x(n) of said digital image signal, $\zeta(0) = \frac{1}{2}$ and $\zeta(k) = 1$ for $1 \leq k \leq N-1$.

13. A method for encoding and decoding low bit rate image signals, comprising the steps of:

(a) providing a digital image signal;
(b) extracting a plurality of subband blocks from said digital image signal, said subband blocks including a low-low frequency subband block;
(c) discarding subband blocks other than said low-low frequency subband block, performing a discrete cosine transform on said low-low frequency subband block, and weighting the coefficients from said discrete cosine transform to make them as close as possible to coefficients for an exact discrete cosine transform of said digital image signal to produce an approximate discrete cosine transform of said digital image signal according to $$\hat{C}(k) = 2\cos\left(\frac{\pi k}{2N}\right)C_g(<k>_{\frac{N}{2}}), \quad k = 0, 1, \ldots, \frac{N}{2} - 1$$

$$= 0, \quad k = \frac{N}{2} \ldots N - 1$$

where said digital image signal has a size of N data points, N is an integer, $\hat{C}$ is the approximate discrete cosine transform of said digital image signal, $C_g$ is the (N/2)-point discrete cosine transform of subsequence g(n), $g(n) = \frac{1}{2}\{x(2n)+x(2n+1)\}$ for $n = 0, 1, \ldots (N/2)-1$, x(n) is the n-point data sequence of the digital image signal;

(d) encoding said digital image signal using discrete cosine transform coefficients corresponding to said low-low frequency subband block; and
(e) decoding said encoded digital image signal; and
(f) performing an inverse discrete cosine transform on said decoded digital image signal using said coefficients according to $$\hat{x}(n) = \frac{1}{N}\sum_{k=0}^{N-1}\zeta(k)\hat{C}(k)\cos\left(\frac{(2n+1)\pi k}{N}\right),$$

$$0 \leq n \leq N - 1$$

where said digital image signal has a size of N data points, N is an integer, x(n) is the N-point data sequence of said digital image signal, C(k) is the discrete cosine transform of x(n), $\zeta(0) = \frac{1}{2}$ and $\zeta(k) = 1$ for $1 \leq k \leq N-1$.

14. A method as recited in claim 13, wherein said digital image signal has a size N×N and said digital image signal is decomposed into four subband blocks.

15. A method as recited in claim 14, wherein said step of performing a discrete cosine transform on said digital image signal includes the step of performing an N/2×N/2-point discrete cosine transform on said N/2×N/2 low-low frequency subband block and weighting the coefficients from said discrete cosine transform to make them as close as possible to coefficients for an exact discrete cosine transform of said digital image signal to produce an approximate discrete cosine transform of said digital image signal.

16. An apparatus for processing digital signals, comprising:
(a) means for providing a digital signal;
(b) means for decomposing said digital signal into a plurality of subbands, said subbands including one or more dominant frequency subbands;
(c) means for discarding subbands other than said dominant frequency subbands and performing a discrete cosine transform on said dominant frequency subbands;

(d) means for weighting the coefficients from said discrete cosine transform to make them as close as possible to coefficients for an exact discrete cosine transform of said digital signal to produce an approximate discrete cosine transform of said digital signal; and (e) means for encoding said digital signal using coefficients from said approximate discrete cosine transform.

17. An apparatus as recited in claim 16, further comprising means for performing an inverse discrete cosine transform on said encoded signal using said coefficients and decoding said encoded signal.

18. An apparatus for processing a digital image signal, comprising:

(a) means for extracting a plurality of subband blocks from said digital image signal, said subband blocks including a low-low frequency subband block;

(b) means for discarding subband blocks other than said low-low frequency subband block, performing a discrete cosine transform on said low-low frequency subband block, and weighting the coefficients from said discrete cosine transform to make them as close as possible to coefficients for an exact discrete cosine transform of said digital signal to produce an approximate discrete cosine transform of said digital signal according to $$\hat{C}(k) = 2\cos\left(\frac{\pi k}{2N}\right)\hat{C}_g(<k>_{\frac{N}{2}}), \quad k = 0, 1, \ldots, \frac{N}{2} - 1$$

$$= 0, \quad k = \frac{N}{2} \ldots N - 1$$

where said digital image signal has a size of N data points, N is an integer, $\hat{C}$ is the approximate discrete cosine transform of said digital image signal, $C_g$ is the (N/2)-point discrete cosine transform of subsequence g(n), g(n)=½{x(2n)+x(2n+1)} for n=0, 1, . . . (N/2)−1, x(n) is the N-point data sequence of the digital image signal; and (c) means for encoding said digital image signal using discrete cosine transform coefficients corresponding to said low-low frequency subband block.

19. An apparatus as recited in claim 18, further comprising means for decoding said encoded digital image signal and performing an inverse discrete cosine transform on said decoded digital image signal according to $$\hat{x}(n) = \frac{1}{N} \sum_{k=0}^{N-1} \zeta(k)\hat{C}(k)\cos\left(\frac{(2n+1)\pi k}{N}\right),$$

$$0 \leq n \leq N - 1$$

where said digital image signal has a size of N data points, N is an integer, x(n) is the N-point data sequence of said digital image signal, C(k) is the discrete cosine transform of x(n), $\zeta(0)=\frac{1}{2}$ and $\zeta(k)=1$ for $1 \leq k \leq N-1$.

20. An apparatus for encoding and decoding low bit rate image signals, comprising:

(a) means for providing a digital image signal;

(b) means for extracting a plurality of subband blocks from said digital image signal, said subband blocks including a low-low frequency subband block;

(c) means for discarding subband blocks other than said low-low frequency subband block, performing a discrete cosine transform on said low-low frequency subband block, and weighting the coefficients from said discrete cosine transform to make them as close as possible to coefficients for an exact discrete cosine transform of said digital image signal to produce an approximate discrete cosine transform of said digital image signal according to $$\hat{C}(k) = 2\cos\left(\frac{\pi k}{2N}\right)\hat{C}_g(<k>_{\frac{N}{2}}), \quad k = 0, 1, \ldots, \frac{N}{2} - 1$$

$$= 0, \quad k = \frac{N}{2} \ldots N - 1$$

where said digital image signal has a size of N data points, N is an integer, $\hat{C}$ is the approximate discrete cosine transform of said digital image signal, $C_g$ is the (N/2)-point discrete cosine transform of subsequence g(n), g(n)=½{x(2n)+x(2n+1)} for n=0, 1, . . . (N/2)−1, x(n) is the N-point data sequence of the digital image signal;

(d) means for encoding said digital image signal using discrete cosine transform coefficients corresponding to said low-low frequency subband block;

(e) means for decoding said encoded digital image signal; and (f) means for performing an inverse discrete cosine transform on said decoded digital image signal using said coefficients according to $$\hat{x}(n) = \frac{1}{N} \sum_{k=0}^{N-1} \zeta(k)\hat{C}(k)\cos\left(\frac{(2n+1)\pi k}{N}\right),$$

$$0 \leq n \leq N - 1$$

where said digital image signal has a size of N data points, N is an integer, x(n) is the N-point data sequence of said digital image signal, C(k) is the discrete cosine transform of x(n), $\zeta(0)=\frac{1}{2}$ and $\zeta(k)=1$ for $1 \leq k \leq N-1$.

* * * * *

UNITED STATES PATENT AND TRADEMARK OFFICE
CERTIFICATE OF CORRECTION

PATENT NO. : 5,426,673
DATED : June 20, 1995
INVENTOR(S) : Mitra et al.

It is certified that error appears in the above-indentified patent and that said Letters Patent is hereby corrected as shown below:

Column 1, line 51, change "signle" to --single--.

Column 4, line 59, change "DCTs" to --DSTs--.

Column 6, line 11, change "$\hat{x}(n)$" to --$x(n)$--.

Column 7, line 60, change "$C$" to --$\hat{C}$--.

Column 7, line 63, change "⊔" to --{--.

Column 8, line 16, change "cosine" to --sine--.

Column 8, line 28, change "$\hat{x}(n)$" to --$x(n)$--.

Column 8, line 28, change "$\hat{C}(k)$" to --$C(k)$--.

Column 8, line 33, change "$\hat{x}(n)$" to --$x(n)$--.

Column 8, line 34, change "$\hat{C}(k)$" to --$C(k)$--.

Column 9, line 40, change "$\hat{x}(n)$" to --$x(n)$--.

Column 9, line 40, change "$\hat{C}(k)$" to --$C(k)$--.

UNITED STATES PATENT AND TRADEMARK OFFICE
CERTIFICATE OF CORRECTION

PATENT NO. : 5,426,673
DATED : June 20, 1995
INVENTOR(S) : Mitra et al.

Page 2 of 3

It is certified that error appears in the above-indentified patent and that said Letters Patent is hereby corrected as shown below:

Column 11, line 56, change "$\hat{C}(k)$" to --$C(k)$--.

Column 12, line 26, change "$\hat{C}_g$" to --$C_g$--.

Column 12, line 49, change "$\hat{x}(n)$" to --$x(n)$--.

Column 12, line 49, change "$\hat{C}(k)$" to --$C(k)$--.

UNITED STATES PATENT AND TRADEMARK OFFICE
CERTIFICATE OF CORRECTION

PATENT NO. : 5,426,673
DATED : June 20, 1995
INVENTOR(S) : Mitra et al.

It is certified that error appears in the above-indentified patent and that said Letters Patent is hereby corrected as shown below:

Column 9, line 45, change "$\hat{x}(n)$" to -- $x(n)$ --.

Column 9, line 46, change "$\hat{C}(k)$" to -- $C(k)$ --.

Column 10, line 38, change "$\hat{x}(n)$" to -- $x(n)$ --.

Column 10, line 38, change "$\hat{C}(k)$" to -- $C(k)$ --.

Column 11, line 56, change "$\hat{x}(n)$" to -- $x(n)$ --.

Signed and Sealed this

Eighteenth Day of March, 1997

Attest:

BRUCE LEHMAN

*Attesting Officer*  *Commissioner of Patents and Trademarks*